United States Patent Office 3,067,095
Patented Dec. 4, 1962

3,067,095
MICROBIOCIDALLY ACTIVE COMPOSITIONS
Evan Baltazzi, Brookfield, Ill., assignor to Nalco Chemical Company, Chicago, Ill., a corporation of Delaware
No Drawing. Filed Sept. 26, 1960, Ser. No. 58,224
13 Claims. (Cl. 167—33)

This invention relates to new compositions of matter which may be used to chemically treat aqueous fluids used in various processes in order to effectively control the growth and reproduction of microorganisms contained therein. More specifically these compositions may be used as agents which give excellent microbiological control in many systems such as paper mills, cooling towers, secondary recovery of petroleum in the process known as water flooding, water wells and similarly related industrial fluid systems.

It is well known in the prior art that certain organic heterocycles containing sulfur have excellent microbiocidal activity. One of the better known sulfur organic heterocycles is 3,5-dimethyl tetrahydro 1,3,5,2H-thiadiazine-2-thione hereinafter simply called thiadiazine. This excellent fungicide and bactericide controls microorganisms encountered in the production and processing of paper, leather, paint, glue, casein, starch and other materials. One industrial source of the said compound is known as Crag Fungicide 974 and is produced by Union Carbide Chemicals Company. Other sources are available. The production of the thiadiazine may be easily effected by a synthesis involving carbon disulfide, methyl amine and formaldehyde. Compounds having similar properties may also be obtained by using carbon disulfide, higher aldehydes, and other primary alkyl amines.

An example of thiadiazine's microbiocidal activity shows that the compound inhibits the growth of *Aerobacter aerogenes* at 50 p.p.m., *Bacillus mycoides* at 20 p.p.m., *Aspergillus niger* at 85 p.p.m., and *Penicillium expansum* at 45 p.p.m. In paper manufacturing the continuous addition of thiadiazine at a rate of 3 to 8 ounces per ton of pulp gives excellent control of slime. In addition to preventing mold growth and bacterial decomposition in processing of cellulose, thiadiazine also gives excellent control of such growth and decomposition in materials such as paste, oils, latex, rubber, gums, waxes, adhesives, asphalt and textiles.

Although thiadiazine affords excellent fungicidal and bacterial control, in many industrial systems there are several problems encountered in its use which make it somewhat unsatisfactory. The compound itself is only slightly soluble in water. Consequently use must be made of organic or aqueous organic blends in order to obtain a completely solubilized product. If the compound is used in an aqueous system by itself without solubilizing formulation, its lack of dispersibility results in poor bacterial control. If a liquid formulation containing water is made, it has been found that the thiadiazine undergoes slow decomposition giving completely water insoluble precipitates. This decomposition which has been hypothesized to be a hydrolytic attack upon the "ring" component of the compound's molecular structure, causes considerable loss in activity even before the compound can be put to its intended use after synthesis.

Another drawback is that if thiadiazine fungicide is applied directly, there is considerable adherence to the material that is being processed. For example, in the manufacture of cellulose products such as paper, a direct application of thiadiazine tends to cause adherence to cellulose fibers and a considerable amount of material can be carried through the system without imparting any fungicidal acivity. Not only is the problem of preliminary hydrolysis present in the use of such a liquid formulation of thiadiazine, but also many processes are well suited only to solid formulations. Liquid formulations require relatively elaborate measuring and pumping systems. Consequently, it would be a valuable contribution to the art if a solid composition containing thiadiazine could be made which has good dispersibility and stability, can be simply applied, and yet is economical to produce.

More specifically, it would therefore be a valuable contribution to the art if water insoluble compounds such as thiadiazine could be made available in a form which remains stable for an indefinite period of time and still effectively controls a wide variety of microorganisms at low economic dosages, and which can be applied simply and efficiently at low cost without the use of elaborate pumping systems.

It therefore becomes an object of the invention to provide a new composition of matter containing thiadiazine.

A further object is to provide a ready source of thiadiazine in a solid, stable form which is highly dispersible and microbiocidally effective in aqueous systems, and which can be introduced into aqueous systems by simple means.

An additional object is to provide a new method for controlling the growth of microorganisms using low dosages in a liquid system by the use of the solid composition described herein.

A further object is to provide efficient microbiocidal control in various industrial systems such as paper mills and secondary petroleum recovery systems.

An additional object is to introduce microbiocidal material into process systems in a form which permits it to effectively control microorganisms before it adheres to the materials which are being processed.

Another object is to provide microbiocidal protection in such a manner that the cost is not prohibitive in industrial process systems.

A further object is to form a uniform high degree of dispersion of thiadiazine in the system in which it is to be used, to the point where the dispersion provides a continuous superior high level of activity.

A further purpose of the invention is to provide a method to produce a solid, highly effective, and easily dispersed microbiocidal composition in any desired form such as briquette, pellets, balls, etc.

Another object is to allow treatment of industrial process waters to mitigate and protect against molds, slimes, fungi and bacteria of all types by the use of the stable solid microbiocidal composition described herein.

In accordance with the invention it has been found that certain heterocyclic compounds as thiadiazine may be intimately combined in various proportions with such dispersing agents as metal lignates, metal tannates and other naturally occurring organic dispersants. In particular it has been found that industrial sources of thiadiazine like Crag 974 may be stabilized by physically mixing in various proportions with metal lignate salts. As a result of such solid formulations the thiadiazine remains stable over a period of many months, and in addition it is rendered easily dispersible so that it can be directly fed into the industrial process water to be treated.

Another desirable aspect of a solid formulation as described above herein is a substantial lessening of adherence by the microbiocide to the particular materials to be treated. For example, a solid formulation of this type is dispersed rapidly enough to act upon and control microbiological organisms and mitigate growth of such organisms which tend to form slimes in the various parts of the papermaking plants before a physical-chemical adherence to the cellulose fibers occurs. At the time such adherence occurs, microbiological activity is lessened in proportion to the amount of adherence. A solid composition of the type described herein tends to reduce the attractive forces between the thiadiazine itself and the cellulose, besides rendering the thiadiazine stable and easily dispersible.

The thiadiazine may be combined with the metal salts of a lignosulfonic acid in proportions by weight of lignosulfonate to thiadiazine of at least 1:1. Preferential proportions of said lignosulfonate to thiadiazine range from 1:1 to 4:1 with the optimum being 1.67 to 1.

Many types of dispersing agents may be used but more satisfactory performance is obtained when sodium and/or calcium lignosulfonates are used. In a preferred practice, a blend of sodium and calcium lignosulfonates is used and may be employed in weight proportions of sodium to calcium lignosulfonates of from 1:10 to 10:1. Dispersing agents of the type described above give extra compactness and cohesiveness to the solid composition besides inhibiting the hydrolyzing effect on thiadiazine of any minor amounts of water which are necessary in formulating the desired solid composition.

The following are typical analyses of both calcium lignosulfonate, and sodium lignosulfonate which were employed in the invention.

CALCIUM LIGNOSULFONATE—TYPICAL ANALYSIS

Moisture _____ 3.0–5.0%.
Lime (as calcium oxide) _____ 6.0–8.0%.
Ash _____ 7.0–9.0%.
Tannins _____ 40.0–42.0%.
Sugars (approximately) _____ 20.0%.
Iron _____ 0.05% max.
pH of a 50% solution _____ 4.0–5.5.
Bulk density (approximately 35#/cu. ft.

SODIUM LIGNOSULFONATE—TYPICAL ANALYSIS

Moisture _____ 3.0–5.0%.
Lime (as calcium oxide) _____ 0.4% max.
Ash _____ 20.0%.
Sugars (approximately) _____ 20.0%.
Iron _____ 0.05%.
pH of a 50% solution _____ 6.0–7.5.

In order to form a more cohesive mass, certain microbiocidally inert fillers are often helpful. Such fillers not only give bulk to the solid formulation but also act as solubilizing and/or dispersing aids. In addition, these substances allow the ingredients to be shaped to any desired form. Any economical inert inorganic filler may be employed in the invention. However, sodium chloride added together with sodium carbonate gives the best performance while at the same time being inexpensive. The sodium carbonate-sodium chloride filler may consist of weight proportions of from 1:10 to 10:1 of sodium carbonate to sodium chloride.

In a specific embodiment of the invention, certain bentonitic clays are desirably employed in the composition in order to serve both as fillers and to provide even better dispersibility of the solid formulation in the particular industrial process water where control of microorganisms is necessary. Although any of the well known bentonitic clays may be used, a more desirable facet of the invention is the use of such clays as montmorillonite or hectorite. The preferred embodiment of the invention is a composition containing montmorillonite, which imparts the optimum desirable characteristics achievable by the solid formulation.

A certain amount of water is necessary to impart cohesiveness and workability to the above described solid substances. It is necessary however, to limit the amount of water in the formulation in order to maintain the desired stability of the thiadiazine. In addition, it must be noted that the amount of water that is added may not necessarily be the same amount of water in the finished product. In the process of molding the particular desired solid form, much of the water that has been added to the composition is driven out.

If, for example, pressure and high temperature is used to shape the inventive formulation into a briquette, much of the water that was originally added in order to work the composition may be vaporized by the pressing operation. Also if a granulated product is desired, water vapor may be lost merely through the drying process used in granulating.

It has been found that a stable, yet cohesive, composition may be obtained by using water in amounts from 2 to 20% by weight of the total solid composition, in preparing solids for briquetting. However, the more preferred amount of water is from 5 to 10%.

As an aid in preparing the composition of the invention there is listed below a general formula of ingredients used.

GENERAL FORMULA

Ingredients:                              Percent by weight
(A) Thiadiazine:
    (1) Useful range _____ 10–20
    (2) Preferred range _____ 15–20
(B) A metal salt of a lignosulfonic acid selected from the group consisting of alkali metals, alkaline earth metals and ammonia salts:
    (1) Useful range _____ 20–40
    (2) Preferred range _____ 20–30
(C) Bentonitic clay:
    (1) Useful range _____ 3–20
    (2) Preferred range _____ 5–10
(D) Inert inorganic filler:
    (1) Useful range _____ 25–65
    (2) Preferred range _____ 25–40
(E) Water:
    (1) Useful range _____ 2–20
    (2) Preferred range _____ 5–10

If one skilled in the art combines the ingredients in the designated ranges, a solid composition of any form desired may be made. A briquette may be made in the shape of a ball or a pellet, or the composition may be provided merely as a powder. It has been shown that a superior form giving excellent stability and feedability is a ball shaped solid briquette.

While the mode of addition of constituents in making the desired ball is not considered critical, an excellent method consists in adding all the dry ingredients to a Simpson mixer, admixing for 5 minutes with the requisite water, dropping said ingredients into a hopper and then feeding into a molding machine. The finished product can be bagged and is then available for immediate use.

Generally, just prior to microbiocidal use, the compositions are generally slowly dissolved in a hopper containing water and/or small amounts of an organic solvent and the resulting solution is slowly fed into the process system. If the ball type composition is used, a simple and inexpensive method of feeding same may be effected by a bypass or gravity type ball feeder. These feeders are described in detail in the Nalco Chemical Company Bulletin No. 54. In many cases water solution alone may be all that is necessary for complete solubilization. The ball composition may also be dropped directly into various parts of a system to be controlled, as for example the headbox in a paper mill.

The stability of the thiadiazine is such that there is no breakdown of its molecule in solution if it is put into sufficiently rapid use. Dosages of course are dependent upon the system to be controlled and the microbiological activity of the particular thiadiazine formulation used.

The invention will be further illustrated but is not to be limited by the following examples.

*Example I*

This example illustrates the improved storage stability of a solid composition. In order to determine the efficacy of the invention, a typical commercial water-isopropanol liquid formulation containing thiadiazine was prepared and compared to four solid ball type briquette compositions containing various amounts of moisture as described below:

COMPOSITION A—AN ISOPROPANOL-WATER LIQUID COMPOSITION OF 15% THIADIAZINE HAVING A RATIO OF ISOPROPANOL TO WATER OF 1:6

| Ingredients | Solid compositions | | | |
|---|---|---|---|---|
| | B percent by weight | C percent by weight | D percent by weight | E percent by weight |
| Thiadiazine | 15.0 | 15.0 | 15.0 | 15.0 |
| Sodium Lignosulfonate | 20.0 | 20.0 | 20.0 | 20.0 |
| Montmorillonite | 7.5 | 7.5 | 7.5 | 7.5 |
| Sodium chloride | 30.0 | 29.0 | 26.0 | 30.0 |
| Sodium carbonate | 22.5 | 19.5 | 17.5 | 17.5 |
| Calcium Lignosulfonate | 4.0 | 4.0 | 4.0 | 4.0 |
| Water | 1.0 | 5.0 | 10.0 | 6.0 |
| | 100.0 | 100.0 | 100.0 | 100.0 |

After 3 to 4 months' shortage time, precipitation was observed in liquid samples of Composition A stored at room temperature. The same type of precipitation occurred after one week storage time at 130° F. This precipitate, unlike thiadizine, was completely insoluble in water and in other common organic solvents. Solid Compositions B–E showed no visible signs of any decomposition.

*Example II*

The stability and resultant activity of Compositions B, C and D were compared to Composition A at 178° F. and 130° F. in the following manner. The Compositions A, B, C and D were prepared as described above. These samples were then tested for storage stability by placing them in two ounce jars and then storing them at either of the above temperatures in incubators. Sample jars were removed and the contents tested for microbiological activity after various intervals of storage time had elapsed as set forth below in Tables I and II. Duplicate samples of each formulation were placed in the test incubators to allow for the disposal of a sample once tested.

Tests of the microbiological activity of the respective stored samples, were conducted as follows:

Organisms *Aerobacter aerogenes* and *Aspergillus niger* were selected for culture since they are typical of microorganisms found in mill water systems and other industrial process waters. The culture medium used consisted of 24 grams of dextrose, 1 gram of Basaminbact (Anheuser Busch), added to one liter of Chicago tap water and sterilized by autoclaving under 15 pounds of pressure for 15 minutes. Appropriate amounts of 18 to 24 hour nutrient broth culture of *A. aerogenes* and *A. niger* were respectively mixed with 200 ml. of the culture medium to form a primary culture immediately before starting tests. The amount of nutrient broth culture used was such as to give one million organisms per ml. of medium. 20 ml. of the inoculated culture medium were placed in each of a series of fermentation tubes with caps which contained the appropriate concentration of stock chemical to avoid more than a 5% error in final dilution. For this purpose, the volume of chemical introduced should be 1 ml. or less. The chemical and the inoculated medium were mixed gently. A control test was also run in which the chemical was omitted. In mixing, each tube was inverted in such a manner as to fill the upright closed end of the tube with the test liquid. The tubes were incubated at 30° C. for 48 hours. At the end of one hour in contact with treating agent, and again after 24 hours' contact a loopful of the test mixture was withdrawn from each tube and inoculated in a subculture tube containing 10 ml. of sterile nutrient broth. The subculture tubes were incubated at 37° C. for 48 hours and examined for growth. The results of these tests indicated 1 and 24 hour killing ranges. The gas production in the primary culture for inhibition level was recorded at 48 hours for *A. aerogenes*. Growth inhibition in the primary culture was recorded for *A. niger* after five days.

If the chemical has bacteriostatic or fungistatic action at the concentration tested there will be no growth or gas production in some of the tubes. At some point in the series of dilutions growth or gas will appear and these will be present in all lower concentrations. The inhibiting range is defined by two numbers, the lesser one that at which gas or growth appears, the higher one that at which these are absent. For example, if growth or gas occurs at 10 p.p.m. of bactericide concentartion, but no growth or gas at 15 p.p.m., the inhibiting range is expressed as 10–15 p.p.m. indicating that the concentration of chemical necessary to inhibit growth lies somewhere between these values.

The 1 hour killing range and the 24 hour killing range are determined in a similar manner by observing the subculture tubes for the presence or absence of growth after the appropriate period of incubation.

Results of the above tests are tabulated in the following Tables I, II, and in Tables IV and V which appear in Examples IV and V.

TABLE I.—FORMULATION STORAGE STABILITY AND ACTIVITY STUDIES AT 178° F.[1]

| Composition | Time of Sample Storage Prior to Activity Test | | | | |
|---|---|---|---|---|---|
| | 0 hours | 1 day | 4 days | 7 days | 14 days |
| A | 20–30 | [2] 20–30 | 70–80 | 100–200 | 200–500 |
| B | 20–30 | 20–30 | 40–50 | 40–50 | 40–50 |
| C | 20–30 | 20–30 | 40–50 | 40–50 | 50–60 |
| D | 20–30 | 20–30 | 40–50 | 50–60 | 50–60 |

[1] Tabulated units show *A. niger* inhibition range in p.p.m. after 5 day incubation of primary culture.
[2] Precipitation occurred at this time period.

TABLE II.—FORMULATION STORAGE STABILITY AND ACTIVITY STUDIES AT 130° F.[1]

| Composition | Initial | 1 day | 4 days | 6 days | 10 days | 14 days | 21 days | 28 days | 35 days |
|---|---|---|---|---|---|---|---|---|---|
| A | 20–30 | [2] 20–30 | 40–50 | 50–60 | 60–70 | 100–200 | 200–500 | 200–500 | 200–500 |
| B | 20–30 | 20–30 | 20–30 | 20–30 | 20–30 | 20–30 | 20–30 | 30–40 | 40–50 |
| C | 20–30 | 20–30 | 20–30 | 20–30 | 20–30 | 30–40 | 30–40 | 40–50 | 50–60 |
| D | 20–30 | 20–30 | 20–30 | 20–30 | 20–30 | 30–40 | 40–50 | 40–50 | 50–60 |

[1] Tabulated units show *A. niger* inhibition range in p.p.m., after 5 day incubation of primary culture.
[2] Precipitate appeared between 1–4 days.

*Example III*

In order to determine the solubility of such solid formulations as described above, Composition E was investigated.

A solid composition was made up in the form of a ball about 3 inches in diameter, weighing about 14 ounces. Each ball tested was first weighed and then placed in a ball solubility test device consisting essentially of a glass tube, 4½ inches in diameter, with a water inlet at the bottom and a water outlet at the top. Water at the respective desired test temperatures was caused to flow through the tube inlet at a rate of 1 gallon per minute.

Any solid residue remaining at the end of the test time was air dried and weighed. Test results are tabulated as follows taking averages of three test runs.

TABLE III

| Temperature | Solubility, percent | Time, hours |
|---|---|---|
| 60° F | 85 | 4 |
| 80° F | 100 | 4 |
| 100° F | 100 | 3 |
| 120° F | 100 | 2 |

*Example IV*

Another comparison was made between Composition A and Composition E directly at 130° F. The microorganism to be controlled was *Aerobacter aerogenes* with the test method being described above. These results are presented below in Table IV.

TABLE IV.—COMPARISON OF STORAGE STABILITY OF A AND E AT 130° F.[1]

| Composition | Sampling Intervals | | | | |
|---|---|---|---|---|---|
| | 0 hour | 1 week | 2 weeks | 3 weeks | 4 weeks |
| E | 20–30 | 20–30 | 30–40 | 30–40 | 40–50 |
| A | 20–30 | 50–60 | 100–200 | 200–500 | 200–500 |

[1] Tabulated units show inhibition range of *A. aerogenes* expressed in p.p.m., after 48 hours of incubation of primary culture.

*Example V*

In order to directly compare the pre-storage activity at room temperature, Compositions A and E were tested for microbiological activity immediately after preparation, Table V shows this comparison of kill and inhibition effects on both *A. aerogenes* and *A. niger* using the test method previously described.

TABLE V.—COMPARISON OF A AND E AT ROOM TEMPERATURE IMMEDIATELY AFTER MAKEUP[1]

| Composition | A. aerogenes | | |
|---|---|---|---|
| | 1 hour kill | 24 hour kill | 48 hour inhibition |
| A | 7,500 | 200–500 | 100–150 |
| E | 7,500 | 200–500 | 100–150 |
| | A. niger | | |
| A | 7,500 | 100–200 | 20–30 |
| E | 7,500 | 100–200 | 20–30 |

[1] Tabulated units show inhibition and killing range in parts per million.

*Example VI*

A 5,000 pound production run of a 15% thiadiazine solid Composition E was made for field testing, using processing plant equipment ordinarily used for full scale chemical production. This solid composition gave excellent control in the white water system of a paper mill over a period of 3 to 4 months and showed almost no loss in activity. Thus, the hydrolytic breakdown of the microbiocidal composition has been substantially prevented by such a solid formulation. In addition, the ball form which was employed was readily dispersible in a hopper and then dispensed throughout the white water paper mill system needing control. Also, there was little or no cellulose pickup of treating agent as evidenced by the continuing high level of activity.

In summary, Table I shows that the solid compositions B, C and D remain active up to 14 days whereas the liquid composition A steadily decreases in activity. Use of Composition A requires a many fold increase in microbiocide dosage. This is not true in the case of the three solid compositions.

Table II shows the stability of the solid formulations over a longer length of time and at a lower temperature. Again the well known liquid formulation decreases quite rapidly in activity. In particular, it is to be noted that a precipitation appeared between 1 to 4 days in the liquid formulation.

Table III shows that a typical solid formulation has excellent solubility at normal room temperature and may be effectively employed either directly or made up as an aqueous solution prior to use.

Table IV again shows the effectiveness of a typical composition of the invention in treating a specific bacteria. The well known liquid industrial thiadiazine microbiocide compared directly against the solid Composition E, showed poor microbiological control in the case of the liquid formulation.

Table V points out that the use of a solid composition does not decrease the activity of the microbiocide in any way since the activity of such a solid composition at time of preparation is the same as that of the well known liquid Composition A at the time it is prepared. As mentioned before, the effect of liquid Composition A decreases noticeably, however, when stored for even short periods of time.

If the solid composition of this invention is directly fed into an industrial process system, its superior effectiveness will be particularly noted when the water is recirculated and reused. Slow release of the solid formulation into the aqueous fluid to be treated, contributes to attainment of the advantage of prolonged stability and activity.

The invention is hereby claimed as follows:

1. A solid stable microbiocidally active composition comprising (A) 3,5 dimethyl-tetrahydro-1,3,5-2H thiadiazine-2-thione and (B) a metal salt of a lignosulfonic acid where the weight proportion of (B) to (A) is at least 1:1.

2. The composition of claim 1 wherein the weight proportion of (B) to (A) is from 1:1 to 4:1.

3. The composition of claim 1 wherein the proportion of (B) to (A) is 1.67:1.

4. A solid stable microbiocidally active composition comprising:

| Ingredients— | Percent by weight |
|---|---|
| (A) 3,5 dimethyl-tetrahydro-1,3,5-2H thiadiazine-2-thione | 10–20 |
| (B) A metal salt of a lignosulfonic acid selected from the group consisting of alkali metal, alkaline earth metal and ammonia salts | 20–40 |
| (C) A bentonitic clay | 3–20 |
| (D) Inert inorganic filler | 25–65 |
| (E) Water | 2–20 |

5. A solid stable microbiocidally active composition comprising:

| Ingredients— | Percent by weight |
|---|---|
| (A) 3,5 dimethyl-tetrahydro-1,3,5-2H thiadiazine-2-thione | 15–20 |
| (B) A metal salt of a lignosulfonic acid selected from the group consisting of alkali metal, alkaline earth metal and ammonia salts | 20–30 |
| (C) A bentonitic clay | 5–10 |
| (D) Inert inorganic filler | 25–40 |
| (E) Water | 5–10 |

6. The composition of claim 5 wherein the bentonitic clay is montmorillonite.

7. The composition of claim 5 wherein the inert inorganic filler is a combination of sodium carbonate and sodium chloride in weight proportions to each other of from 1:10 to 10:1.

8. The composition of claim 5 wherein the metal salt of a lignosulfonic acid is a combination of sodium lignosulfonate and calcium lignosulfonate in weight proportions to each other of from 1:10 to 10:1.

9. A method of treating industrial process waters in order to control the growth of microorganism which comprises treating said process waters with a biologically active amount of a solid stable, microbiocidally active, composition comprising (A) 3,5 dimethyl-tetrahydro-1,3,5-2H thiadiazine-2-thione and (B) a metal salt of a lignosulfonic acid where the weight proportions of (B) to (A) is at least 1:1.

10. A ball briquette made from the composition of claim 4.

11. A ball briquette made from the composition of claim 5.

12. An aqueous suspension comprising a major portion of suspended cellulose fibers and at least a biologically-active amount of a stable, microbiocidally-active composition comprising (A) 3,5 dimethyl-tetrahydro-1,3,5-2H thiadiazine-2-thione and (B) a metal salt of a lignosulfonic acid where the weight proportion of (B) to (A) is at least 1:1.

13. The microbiocidally active composition of claim 12 which comprises:

| Ingredients— | Percent by weight |
|---|---|
| (A) 3,5 dimethyl-tetrahydro 1,3,5-2H thiadiazine-2-thione | 10–20 |
| (B) A metal salt of a lignosulfonic acid selected from the group consisting of alkali metal, alkaline earth metal and ammonia salts | 20–40 |
| (C) A bentonitic clay | 3–20 |
| (D) Inert inorganic filler | 25–65 |
| (E) Water | 2–20 |

References Cited in the file of this patent

UNITED STATES PATENTS

| 2,760,900 | Glenn et al. | Aug. 28, 1956 |
| 2,838,389 | Yoder | June 10, 1958 |